United States Patent
Höcherl et al.

(10) Patent No.: US 6,266,570 B1
(45) Date of Patent: Jul. 24, 2001

(54) METHOD FOR DETERMINATION AND OPTIMIZATION OF AN OPERATING ACCURACY OF A MACHINE TOOL, A ROBOT OR THE LIKE

(75) Inventors: Günther Höcherl, Herzogenaurach; Roland Moser, Neumarkt; Hans-Peter Tröndle, Forchheim; Georg Wiegärtner, Pottenstein, all of (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 09/117,132

(22) PCT Filed: Dec. 9, 1996

(86) PCT No.: PCT/DE96/02358

§ 371 Date: Jul. 23, 1998

§ 102(e) Date: Jul. 23, 1998

(87) PCT Pub. No.: WO97/27521

PCT Pub. Date: Jul. 31, 1997

(30) Foreign Application Priority Data

Jan. 24, 1996 (DE) .............................................. 196 02 470

(51) Int. Cl.[7] .............................. G05B 13/02; G06F 19/00
(52) U.S. Cl. ............................... 700/54; 700/170; 700/193
(58) Field of Search ....................... 318/568.13; 700/160, 700/189, 61, 54, 159, 174, 184, 188, 193, 170

(56) References Cited

U.S. PATENT DOCUMENTS

| 4,070,608 | * | 1/1978 | Rosshirt | 318/572 |
|---|---|---|---|---|
| 4,222,692 | * | 9/1980 | Pavlovsky | 409/141 |
| 4,234,777 | * | 11/1980 | Balfanz | 219/125.1 |
| 4,428,055 | * | 1/1984 | Kelley | 700/160 |
| 4,543,625 | * | 9/1985 | Nozawa | 700/174 |
| 4,642,752 | * | 2/1987 | Debarbieri | 700/160 |
| 4,677,568 | | 6/1987 | Arbter . | |
| 5,260,631 | * | 11/1993 | Hayashida | 318/594 |
| 5,305,241 | * | 4/1994 | Hayashi | 702/94 |
| 5,371,451 | * | 12/1994 | Toyosawa | 318/568.13 |
| 5,434,793 | * | 7/1995 | Korner | 700/189 |
| 5,532,932 | * | 7/1996 | Niwa | 700/188 |
| 5,544,046 | * | 8/1996 | Niwa | 700/159 |
| 5,589,086 | * | 12/1996 | Sawada | 219/69.16 |

FOREIGN PATENT DOCUMENTS

| 0 165 436 | 12/1985 | (EP) . |
| 0 383 328 | 8/1990 | (EP) . |
| 0 510 204 | 10/1992 | (EP) . |
| WO 91/20021 | 12/1991 | (WO) . |
| WO 94/07187 | 3/1994 | (WO) . |

\* cited by examiner

*Primary Examiner*—William Grant
*Assistant Examiner*—Ronald D Hartman, Jr.
(74) *Attorney, Agent, or Firm*—Staas & Halsey LLP

(57) ABSTRACT

Standard, existing position measuring systems are used to determine and optimize operating accuracy. For this, in a positional measurement, path information on any desired number of axes is sampled over a predefinable measuring interval and stored. The acquired data are converted and prepared using signal processing measures, enabling conclusions to be drawn about the actual operating accuracy and about causes of inaccuracies.

11 Claims, 2 Drawing Sheets

METHOD FOR DETERMINATION AND OPTIMIZATION OF AN OPERATING ACCURACY OF A MACHINE TOOL, A ROBOT OR THE LIKE

SUMMARY OF THE INVENTION

The present invention relates to the use of conventional elements of a machine tool, a robot or the like for determining and optimizing their operating accuracy.

BACKGROUND INFORMATION

In developing and starting up machine tools or robots, the development or installation engineer often encounters the problem, independently of the control task at hand, of having to properly adjust tightened controller configuration or pilot controls, and of being able to simply recognize their effects. For this, auxiliary measuring systems are usually needed, which, due to the level of accuracy required, entail substantial additional outlay for development and start-up operation. For example, to determine the operating accuracy of a machine tool, a plurality of expensive measuring instruments are used, often costing more than DM 150,000. In addition, such measuring instruments require specially trained personnel.

To perform a synchronous measurement, for example, one needs expensive acceleration sensors, a charge amplifier and spectral analyzers. Thus, for example, inductive displacement probes can be used, but only those having a ruler (i.e., straight-edge rule) of the highest possible surface quality, which entails correspondingly high costs. Besides the costs, when such auxiliary devices are used to determine synchronism, problems arise with respect to axial overlapping. In addition, spindle influences are not easily ascertained.

To determine positioning trueness (i.e. accuracy), inductive displacement probes are usually used. These are very slow, however. When working with optical encoders (i.e. indicators), the problem arises that the location where the position is measured—usually a glass scale—is not easily accessible.

To measure the contour trueness or other contour features, such as corners, using conventional methods, a very time-consuming workpiece measurement is required. For this, in turn, expensive measuring instruments are needed.

To perform a test of circularity, conventional methods require a circular calibration standard having a two-dimensional probe head, which entails costly adjustment with respect to the circle center. In addition to this, a separate circular calibration standard is required for each circle radius. The costs this entails are substantial and, depending on the (i.e. required) accuracy, amount to over DM 100,000.

Similarly, by enlarging a segment (i.e. detail) of the setpoint path and the actual path, the trueness of contour can be determined, it no longer being possible in this case to examine the entire path curve, since enlargement factors within the range of 100 to 1000 are needed.

European Patent Application No. 165 436 describes a method for programming robot movements in a manner the economizes on memory space. To determine and optimize the synchronism, the causes of inaccuracies are determined by performing a spectral analysis on the path deviation values, in particular by performing a Fourier analysis. In this manner, besides a programming that economizes on memory space, the dynamic performance of the robot being used is able to be described by a transfer function, rendering possible a speed-independent compensation of the robot's dynamic performance in the spectral region.

A method for testing the operating accuracy of an NC machine is described in International Patent Application No. 94/07187. The operating accuracy of the NC machine is checked by comparing a circular setpoint path to an actual circular path that describes the machine's actual motion in accordance with a position control signal that describes the setpoint path of motion. However, this is only possible for an at least two-axis NC machine. Also, the method is limited to a circular setpoint path.

A method for determining the operating accuracy of a numerically controlled machine is described in European Patent Application No. 510 204. Positions which occur in response to the corresponding actuating signals for the machine axes in question are periodically detected in the X and Y direction. The setpoint path is contrasted to the active actual path, and it is checked whether deviations lie within the scope of a permitted range or exceed the range.

SUMMARY OF THE INVENTION

An object of the present invention is to provide methods for determining and, moreover, optimizing the operating accuracy of machine tools, robots or other numerically controlled machines, which will not require any additional cost outlay for expensive measuring systems, and which will enable a statement of accuracy to be made to the ultimate consumer, without having to measure the workpieces and, moreover, also render possible an early detection and localization of errors.

The object is achieved according to the present invention by using existing position measuring systems of a machine tool, a robot or the like for determining and optimizing their operating accuracy. Path information on any desired number of axes is sampled (i.e. scanned) over a predefinable measuring interval and stored in a numerical control (i.e. operation) using a position measurement. The thus acquired data is converted and prepared in a way that enables conclusions to be drawn about the actual operating accuracy and about causes of inaccuracies, and compensation parameters that have an effect on the causes are calculated so as to counteract the causes of the inaccuracies, in that the data representing the path information is converted and prepared according to the following additional method steps:

from the data representing the path information, an actively described actual path of the designated axes is determined in accordance with the underlying contour, and compared to the profile of a corresponding setpoint path;

a geometric relation is established between the actual path and the setpoint path, in that a setpoint-value vector is determined, which has the same angle as the active actual-value vector;

a contour deviation at a desired path point is determined as the distance (i.e. spacing) between the actual-value vector and the setpoint-value vector at the path point named;

deviations in contour from the setpoint path are minimized through a corresponding adjustment of compensation parameters, such as static friction compensation, momentum precontrol and/or speed precontrol.

Thus, any desired setpoint path can be advantageously optimized. A contour deviation can be determined, which can be retrieved as a direct measure of the machine's operating accuracy at each desired contour. This enables the path accuracy to be determined, for example, of those types of machine tools for which the so-called test for circularity is not very useful (for example, looping-type lathing, camshaft grinding or in form design), since, in these cases, in terms of the axis, no path resembling a circle is driven, i.e., attention is directed to much more complicated geometric forms. Thus, the operating accuracy of numerically controlled machine tools is able to be checked at every desired contour.

In a first advantageous exemplary embodiment according to the present invention, an active actual path is determined quite effectively from the data representing the path information, in that the data representing the path information are measured as following-error values, and the actively described actual path of the designated axes is determined using these following-error values and the setpoint-path values.

In another advantageous exemplary embodiment according to the present invention, the advantages described above are also achieved when working with such machine tools, robots or the like which have linear axes and at least one rotary axis. The setpoint path values and the actual path values pertaining to the rotary axis and existing as polar coordinates are converted into the Cartesian coordinate system, in that radius information is obtained from the linear axis values, and angular information from the rotary axis values.

In another advantageous exemplary embodiment according to the present invention, a contour deviation is determined with maximum possible accuracy using the discrete values existing in a numerically controlled machine tool, a robot or the like. This is achieved in that, as a contour deviation, the true contour deviation at an angle of 900 to the setpoint path is determined using the actual path point and of the two setpoint path points that precede the actual path point in each case with the smallest possible distance and that follow the actual path point with the smallest possible distance.

In another advantageous exemplary embodiment according to the present invention, the measuring results which represent the actual operating accuracy can be shown, without the need for separate display means for that purpose. During development or reconditioning, or also when performing an analysis for early error detection, any existing inaccuracies are able to be analyzed by the development or installation engineer, to research causes without entailing additional expenditure. This is done by displaying the measuring results or data directly on the screen of an existing numerical control unit.

According to yet another advantageous exemplary embodiment of the present invention, not only can the numerically controlled machine tool, the robot, etc., itself be optimized, but a parts program existing on these machines can be optimized as well. This is achieved in that parts program parameters are adjusted in accordance with a previously determined contour deviation of this parts program so that a maximally permissible contour deviation is ensured at each point of the contour to be described.

It is achieved in a first advantageous exemplary embodiment of the present invention that, using a position measuring system of a machine tool, a robot or the like, the synchronism can be specially determined and optimized, there likewise being no need to use expensive measuring systems for this. This is effected in that the data representing the path information are converted and prepared according to the following additional method steps:

for each axis, the path's lead change is determined over time;

for each axis, any path deviation is subsequently determined over time using a method of minimizing error squares;

the causes are determined and isolated using a spectral analysis of the path deviation values, in particular a Fourier analysis.

Another advantageous exemplary embodiment of the present invention further refines the application of existing position measuring systems of a machine tool, a robot or the like for determining and optimizing positioning accuracy. This is likewise achieved without using expensive, external measuring systems. For this, the data representing the path information are converted and prepared according to the following, additional method steps:

at the precise point in their time profile where a control intervention takes place, the ascertained positional values are contrasted to the positional setpoint values;

any deviation is minimized by a corresponding adjustment of compensation parameters, such as compensation for static friction, momentum precontrol, and/or speed precontrol.

Other advantages as well as inventive details are derived from the following description of possible exemplary embodiments, which are each conceived for a different parameter for determining the operating accuracy of a machine tool, a robot or the like.

DETAILED DESCRIPTION OF THE INVENTION

Figure 1:
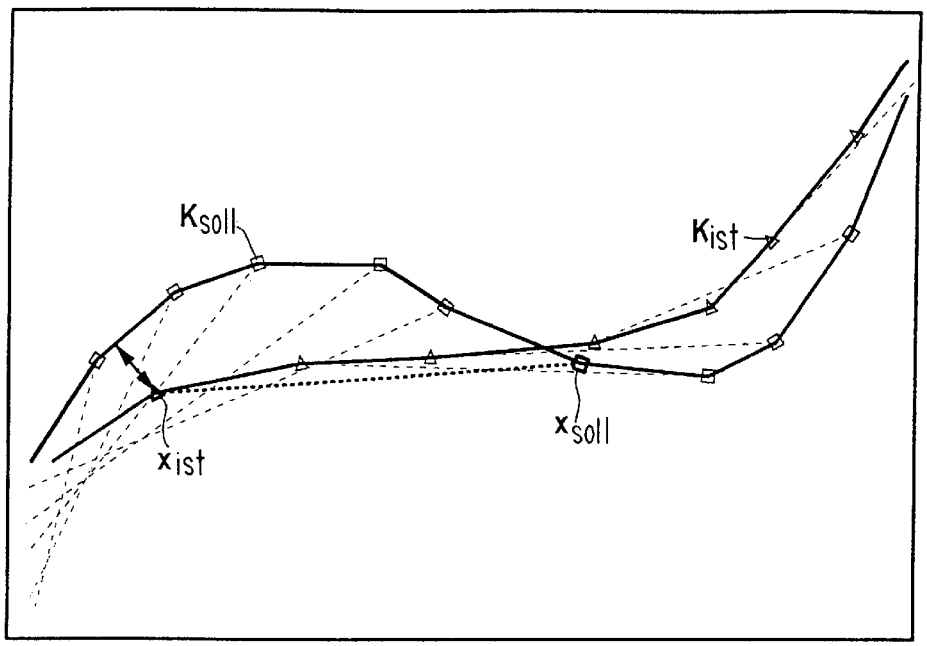
FIG. 1 shows a contour feature in the plane for clarifying the problematic nature of the time and geometric relation between the setpoint path and the actual path.

When working with numerically controlled machine tools, robots or other numerically controlled machines, a position measuring system is generally provided. This can either take the form of an absolute, or as a relative or incremental position system, and work, for example, on an optical or inductive basis. Thus, path information is generally already available in the numerical control. To determine the working accuracy of such a numerically controlled machine, path information (where necessary, also such information on a plurality of axes) are sampled over a predefinable measuring interval and stored. The acquired data contain implicit information about the operating accuracy and the causes of any existing inaccuracies. For this reason, the sampled and stored path information is converted and prepared so as to enable inferences to be made about the actual operating accuracy and the causes of any existing inaccuracies. For this, one can employ any desired signal processing method that is essentially directed to the parameter to be examined with respect to the operating accuracy, i.e., the synchronism, positioning accuracy, or also with respect to the contour trueness. From the thus obtained results, one is able to derive the causes of the errors or of the inaccuracies and counteract them through compensation parameters, in a way that will enable the accuracy of the machine to be optimized both during development and initial operation. Moreover, the obtained results are able to be displayed graphically and numerically, enabling a development or installation engineer to draw further conclusions with regard to possible causes of errors or inaccuracies. An already existing screen of the numerical control or a corresponding programming unit is able to be used advantageously to graphically display these results.

The following will elucidate advantageous exemplary methods for converting and preparing the sampled and stored path information with respect to individual parameters that influence accuracy, such as synchronism, positioning accuracy or contour trueness.

To determine and optimize the synchronism, incorporating an existing position measurement system, as described above, path information on each axis is sampled and stored over a predefinable measuring interval. These data are then processed further to determine the path's lead change over time for each axis. This can likewise be graphically displayed via a screen at the NC control or a corresponding programming unit. Any existing path deviations are subsequently calculated for each axis using, for example, a method for minimizing error squares. Such a path deviation is likewise determined over time. Possible causes are then determined and isolated by performing a spectral analysis on the thus determined path deviation values. As such a spectral analysis, a Fourier analysis, i.e., a so-called fast Fourier transformation, can be performed quite advantageously on a numerical control. Thus, possible causes of inaccuracies, which can lie, for example, in the drives being used, in the converter or, however, in elements of the machine itself can be isolated and allocated.

To determine and optimize existing position measuring systems using the present invention, the positional values determined using the sampled and stored path information are contrasted in their time profile, at the precise point where a control intervention takes place, with the corresponding position setpoint values produced by the numerical control, and any existing deviations are minimized through a corresponding adjustment of compensation parameters. Such compensation parameters can entail, for example, the compensation of stick-slip behavior, i.e., static friction. Other compensation methods include influencing, to this effect, a momentum precontrol and/or a speed precontrol, which may likewise already be available within the framework of a numerical control.

To determine and optimize contour trueness using existing position measuring systems, the path information, sampled and stored over the predefinable measuring interval and determined for each individual axis, is superimposed in accordance with the contour feature to be displayed over a plurality of axes. Each desired contour, such as a circle, a corner, etc., can be displayed. The contour formed by superimposing the data from a plurality of axes is contrasted to the ideal contour form. This enables a test for circularity to be performed.

The profile of the setpoint path, which is known using data from a parts program existing in the numerical control, is compared to the actually described actual path, the later being derived from the path information measured at the position measuring system of at least two axes. To be able to display a possible contour deviation, however, it is not the temporal relation between the setpoint path and the actively described actual path, but rather the geometric relation between the setpoint and actual path that is decisive. For this reason, a setpoint value vector is determined, which has the same angle as the active actual-value vector. The distance between the two vectors can be imaged onto the normal of the setpoint value profile and be shown on an enlarged scale, and represents a measure of a contour deviation in the path point being considered of the setpoint path or actual path. By this means, any desired two-dimensional or multi-dimensional geometric form can be measured and displayed true-to-scale. On the basis of this path imaged onto the normal of the setpoint value profile, the contour deviation is now displayed with a resolution of a suitable definition, enabling one to obtain an image which is already known from the test records of workpiece measurements performed using conventional methods.

A procedure of this kind is especially beneficial for examining the interpolation properties between a linear axis and a rotary axis. An application case of this kind is, for example, the machine grinding of camshafts. In such cases, a test for circularity cannot be performed, since a sinusoidal or cosinusoidal setpoint value profile is assumed.

The contour representation or a determined contour deviation can likewise be used for optimizing a parts program, in order to conform to the maximum permissible contour error at critical transitions. If it is determined that the actual contour deviation exceeds the maximum permissible contour deviation, then parts program parameters are adapted so as to ensure that the actually occurring contour deviation remains within the maximum permissible range. Parts program parameters of this kind can pertain, for example, to checking the maximum possible velocity, driving with or without speed precontrol, or driving with or without rate-of-change limiting, etc.

It is especially beneficial when the data representing the path information are measured as following error values with the aid of the position measuring system. From the known setpoint path and the measured following error, the active actual path is then able to be calculated with a resolution of a suitable definition. If at least one axis is driven as a rotary axis, and a linear axis is likewise provided, then the setpoint path and actual path values, which are available as polar coordinates, must be converted into the Cartesian coordinate system. For this, the radius information is obtained from the values of the linear axis, and the angular information from the values of the rotary axis. Using this information as a baseline, the data for the contour representation can then be prepared. At this processing instant, the measured values have merely a time relationship to one another. However, it is only the geometric relation that is decisive in determining a contour deviation.

In the representation according to FIG. 1, a contour feature is shown for clarifying the difficulty with the temporal and geometric relation between setpoint path $K_{setpoint}$ and actual path $K_{actual}$. The individual interpolation points of setpoint path $K_{setpoint}$ are marked with squares, the interpolation points of actual path $K_{actual}$, correspondingly with triangles. From the profile of the two named contour paths, it is apparent that the actual path point $x_{actual}$ corresponding to any desired setpoint path point $x_{setpoint}$ lags behind the corresponding setpoint path value. However, it cannot always be assumed that setpoint path value $x_{setpoint}$, as in the example shown according to the representation of FIG. 1, runs ahead of actual path value $x_{actual}$. For that reason, different configurations are necessary for determining the geometric relation between the setpoint path and the active actual path as a function of possible known following error profiles.

Figure 2:
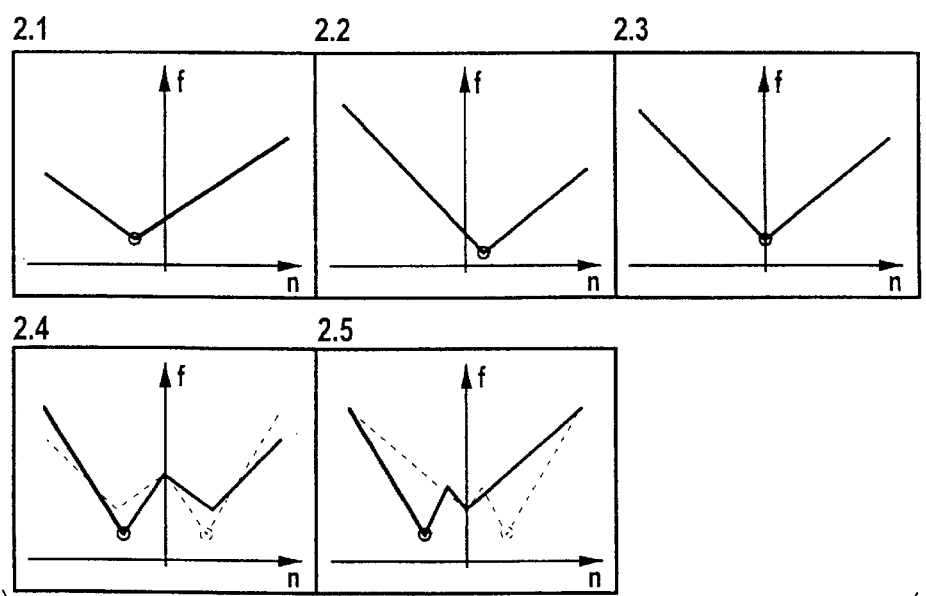
FIG. 2 shows the determination of a setpoint-path point corresponding to an actual-path point as a function of the difference in the path between the active actual value and the setpoint value in question.

The representation according to FIG. 2 illustrates the configurations used most frequently to determine as effectively as possible setpoint value $x_{setpoint}$ corresponding to an actual value $x_{actual}$. In this context, the path difference between active actual value $x_{actual}(x)$ and the respective setpoint value $x_{setpoint}$ ($x \pm n$) is plotted on the ordinate denoted by f in representations 2.1 through 2.5. Value n, which denotes the abscissa, describes whether it is a question in the case of the setpoint value being considered of a setpoint value (negative value of n) preceding the corresponding actual value, or of a setpoint value (positive value for n) following the actual value being considered. In this context, path difference f is determined in accordance with the following computation procedure, which is described, by way of example, for a contour represented using two axes:

$$f(x) = \sqrt{\left\{ \begin{array}{l} [\text{Actual Value\_Axis\_1}(x)\_\text{Setpoint value\_Axis\_1}(x+n)]^2 + \\ [\text{Actual Value\_Axis\_2}(x)\_\text{Setpoint value\_Axis\_2}(x+n)]^2 \end{array} \right\}}$$

The minimum of the determined path difference values f is defined in each case, for which each actual value $x_{actual}(x)$ is assigned, to the extent that is possible, the most proximate setpoint value $x_{setpoint}$ (x+n). Representation 2.1 shows a setpoint value which precedes the actual value. Representation 2.2 shows the reverse situation where the actual value runs ahead of the setpoint value. In representation 2.3, the setpoint value and actual value coincide. In representations 2.4 and 2.5, a more complex profile results for the path difference being determined in each case, where the minimum is determined as the setpoint value most proximate to the actual value to be considered. The minimum shown in representations 2.1 through 2.5 is denoted by circles.

As in the test for circularity, however, determining a contour deviation presupposes that the actual contour deviation is calculated normally to the setpoint path, and is plotted. This is the case when the contour deviation is determined at an angle of 90° to the setpoint path. To also minimize errors in the process, it must also be determined which setpoint value $x_{setpoint}$ (x+n±l) is the most proximate to actual value $x_{actual}$ (x). This is carried out using the procedure already described above.

Figure 3:
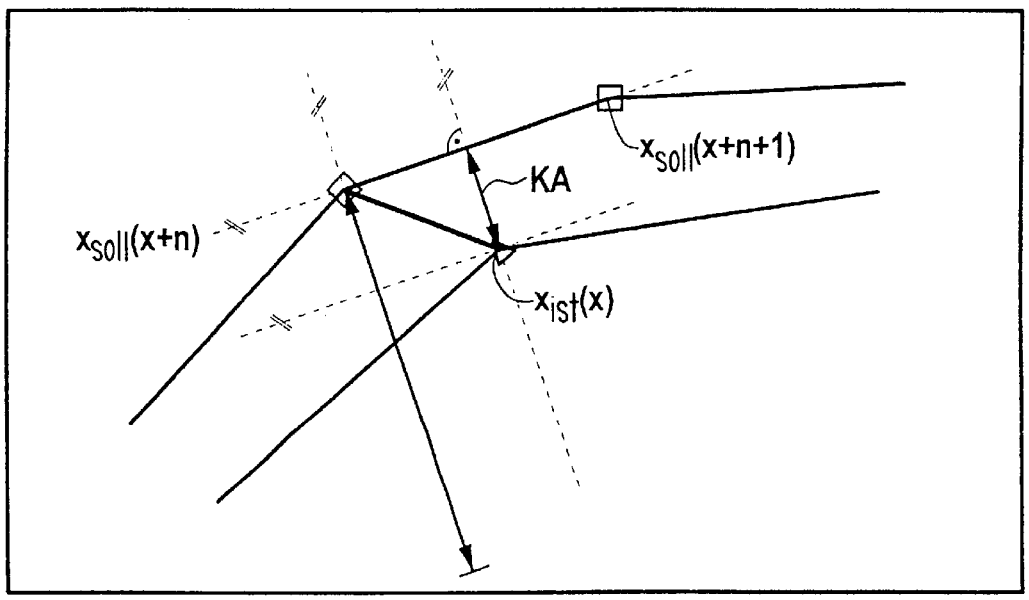
FIG. 3 shows a diagrammatic representation for determining the exact contour deviation from three points in the plane.

The representation according to FIG. 3 illustrates the procedure for determining this true contour deviation from three points in the plane. Shown is an enlarged detail of a contour feature from the representation of FIG. 1. Sketched, on the one hand, is the actively determined actual value $x_{actual}(x)$ and setpoint value $x_{setpoint}(x+n)$ that precedes this actual path point with the slightest distance and setpoint path point $x_{setpoint}(x+n+1)$ that follows the actual path point with the slightest distance. With these three spatial points, a contour deviation is determined, displayed, and analyzed. The thus determined true contour deviation, which has an angle of 90° to the setpoint path curve, is denoted by KA in the representation according to FIG. 3.

Deviations are minimized by properly adjusting compensation parameters, which counteract the causes of the lack of contour trueness. The compensation parameters can be carried out, in turn, in the form of a static friction compensation, a momentum precontrol or also, for example, a speed precontrol. Other compensation measures are also conceivable, however, as a function of the functionality made available in the underlying numerical control.

Thus by using, in accordance with the present invention, existing positional measuring systems to determine and optimize operating accuracy, one attains the following additional advantages. A positional measurement does not necessitate converting accelerating torques or speed values into positional deviations, such conversions being fraught with errors. Thus, the ascertained inaccuracies can be defined very precisely. In addition, there is no need to adjust measuring sensors, such as measuring probes or rulers, or circular calibration standards having two-dimensional probe heads, as used in circularity tests. A measurement can be performed within a few minutes, reducing development and start-up times. In addition, a measuring sequence can be menu-driven within the framework of the operational structure of a numerical control, by integrating it within the menu control. In this manner, the measuring results can be displayed directly on the video screen of the numerical control or programming unit, so that personnel who perform the measurements are provided with additional representation (i.e. display) methods, thus enabling them to draw additional conclusions about possible causes of inaccuracies.

What is claimed is:

1. A method for determining and optimizing an operating accuracy of a device using a position measuring system, comprising the steps of:
   sampling path information data on designated axes over a predetermined measuring interval;
   storing the path information data in a numerical control unit;
   processing the path information data to determine the operating accuracy, the step of processing including the steps of:
      determining an actively described actual path of the designated axes corresponding to a contour of the path information data;
      determining an active actual-value vector as a function of the path information data;
      comparing the actively described actual path to a profile of a corresponding setpoint path;
      determining a setpoint-value vector having a first angle, the first angle being equal to a second angle of the active actual-value vector, the setpoint-value vector establishing a geometric relation between the actively described actual path and the corresponding setpoint path;
      determining a contour deviation at a predetermined path point as a function of a distance between the actual-value vector and the setpoint-value vector at the predetermined path point; and
      adjusting compensation parameters to minimize the contour deviation.

2. The method according to claim 1, wherein the device includes one of a machine tool and a robot.

3. The method according to claim 1, wherein the compensation parameters include at least one of a static friction compensation, a momentum precontrol and a speed control.

4. A method for determining and optimizing an operating accuracy of a device using a position measuring system, comprising the steps of:
   sampling path information data on designated axes over a predetermined measuring interval;
   storing the path information data in a numerical control unit;
   processing the oath information data to determine the operating accuracy, the step of processing including the steps of:
      determining an actively described actual path of the designated axes corresponding to a contour of the path information data,
      determining an active actual-value vector as a function of the path information data,
      comparing the actively described actual path to a profile of a corresponding setpoint path,
      determining a setpoint-value vector having a first angle, the first angle being equal to a second angle of the active actual-value vector, the setpoint-value vector establishing a geometric relation between the actively described actual path and the corresponding setpoint path, determining a contour deviation at a predetermined path point as a function of a distance between the actual-value vector and the setpoint-value vector at the predetermined path point, and adjusting compensation parameters to minimize the contour deviation, wherein:

the path information data is measured as following-error values, and the actively described actual path of the designated axes is determined as a function of the following-error values and setpoint-path values of the corresponding setpoint path.

5. A method for determining and optimizing an operating accuracy of a device using a position measuring system, comprising the steps of:

sampling path information data on designated axes over a predetermined measuring interval;

storing the path information data in a numerical control unit;

processing the path information data to determine the operating accuracy, the step of processing including the steps of:

determining an actively described actual oath of the designated axes corresponding to a contour of the path information data, determining an active actual-value vector as a function of the path information data, comparing the actively described actual path to a profile of a corresponding setpoint path, determining a setpoint-value vector having a first angle, the first angle being equal to a second angle of the active actual-value vector, the setpoint-value vector establishing a geometric relation between the actively described actual path and the corresponding setpoint path, determining a contour deviation at a predetermined path point as a function of a distance between the actual-value vector and the setpoint-value vector at the predetermined path point, and adjusting compensation parameters to minimize the contour deviation, converting polar coordinates to Cartesian coordinates on the linear axis, at least one first axis of the designated axes being a rotary axis, at least one second axes of the designated axes being a linear axis, setpoint path values of the corresponding setpoint path and actual path values of the actively described actual path being the polar coordinates on the rotary axis;

determining radius information as a function of the Cartesian coordinates; and determining angular information as a function of the polar coordinates.

6. A method for determining and optimizing an operating accuracy of a device using a position measuring system, comprising the steps of:

sampling path information data on designated axes over a predetermined measuring interval;

storing the path information data in a numerical control unit;

processing the path information data to determine the operating accuracy, the step of processing including the steps of:

determining an actively described actual path of the designated axes corresponding to a contour of the path information data, determining an active actual-value vector as a function of the oath information data, comparing the actively described actual path to a profile of a corresponding setpoint oath, determining a setpoint-value vector having a first angle, the first angle being equal to a second angle of the active actual-value vector, the setpoint-value vector establishing a geometric relation between the actively described actual path and the corresponding setpoint path, determining a contour deviation at a predetermined path point as a function of a distance between the actual-value vector and the setpoint-value vector at the predetermined oath point, and adjusting compensation parameters to minimize the contour deviation, determining a true contour deviation as a function of the contour deviation at an angle of 90° to the corresponding setpoint path using an actual path point of the actively described actual path, a first point of the setpoint path and a second point of the setpoint path, the first point preceding the actual path point with a smallest possible distance and the second point following the actual path point with the smallest possible distance.

7. The method according to claim 1, further comprising the step of:

displaying one of measuring results and the path information data directly on a screen of the numerical control unit.

8. A method for determining and optimizing an operating accuracy of a device using a position measuring system, comprising the steps of:

sampling path information data on designated axes over a predetermined measuring interval;

storing the path information data in a numerical control unit;

processing the path information data to determine the operating accuracy, the step of processing including the steps of:

determining an actively described actual path of the designated axes corresponding to a contour of the path information data, determining an active actual-value vector as a function of the path information data, comparing the actively described actual path to a profile of a corresponding setpoint path, determining a setpoint-value vector having a first angle, the first angle being equal to a second angle of the active actual-value vector, the setpoint-value vector establishing a geometric relation between the actively described actual path and the corresponding setpoint path, determining a contour deviation at a predetermined path point as a function of a distance between the actual-value vector and the setpoint-value vector at the predetermined path point, and adjusting compensation parameters to minimize the contour deviation, optimizing a parts program to determine a maximally permissible contour deviation at each point of the contour, the optimizing step including the step of adjusting parts program parameters corresponding to a predetermined contour deviation.

9. A method for determining and optimizing an operating accuracy of a device using a position measuring system, comprising the steps of:

sampling path information data on designated axes over a predetermined measuring interval;

storing the path information data in a numerical control unit;

processing the path information data to determine the operating accuracy, the step of processing including the steps of:

determining an actively described actual path of the designated axes corresponding to a contour of the path information data, determining an active actual-value vector as a function of the path information data, comparing the actively described actual oath to a profile of a corresponding setpoint path, determining a setpoint-value vector having a first angle, the first angle being equal to a second angle of the active actual-value vector, the setpoint-value vector establishing a geometric relation between the actively described actual path and the corresponding setpoint path, determining a contour deviation at a predetermined path point as a function of a distance between the actual-value vector and the setpoint-value vector at the predetermined path point, and adjusting compensation parameters to minimize the contour deviation, processing the path information data to determine and optimize a synchronism, including the steps of:

(a) for each axis of the designated axes, determining lead change of the actively described actual path over a time period;

(b) after step a, for each axis of the designated axes, determining path deviation values over the time period using a method of minimizing error squares; and (c) determining and isolating causes of the inaccuracies using a spectral analysis of the path deviation value.

10. The method according to claim 9, wherein the spectral analysis includes a Fourier analysis.

11. The method according to claim 1, further comprising the step of:

processing the path information data to determine and optimize a positioning accuracy, including the steps of:

at a predetermined time point of a control i intervention, comparing positional values to positional setpoint values; and minimizing the contour deviation by adjusting the compensation parameters.

* * * * *